United States Patent [19]

Nakamura et al.

[11] Patent Number: 5,278,921

[45] Date of Patent: Jan. 11, 1994

[54] METHOD OF DETERMINING EXPOSURE

[75] Inventors: Hiroaki Nakamura; Takaaki Terashita, both of Kanagawa, Japan

[73] Assignee: Fuji Photo Film Co., Ltd., Kanagawa, Japan

[21] Appl. No.: 886,400

[22] Filed: May 21, 1992

[30] Foreign Application Priority Data

| May 23, 1991 | [JP] | Japan | 3-118743 |
| May 23, 1991 | [JP] | Japan | 3-118744 |
| May 23, 1991 | [JP] | Japan | 3-118745 |

[51] Int. Cl.$^5$ .............................................. G06K 9/46
[52] U.S. Cl. ............................ 382/18; 358/527; 382/54
[58] Field of Search ............... 382/18, 51, 54, 17; 358/80; H04N 1/46

[56] References Cited

U.S. PATENT DOCUMENTS

| 4,472,736 | 9/1984 | Ushio et al. | 382/18 |
| 4,574,393 | 3/1986 | Blackwell et al. | 382/18 |
| 4,745,465 | 5/1988 | Kwon | 358/80 |
| 4,847,677 | 7/1989 | Mosic et al. | 382/51 |
| 5,119,184 | 6/1992 | Hiratsuka et al. | 358/80 |
| 5,142,593 | 8/1992 | Kasano | 382/18 |
| 5,177,602 | 1/1993 | Fujimori | 358/80 |

FOREIGN PATENT DOCUMENTS

| 52-156624 | 12/1977 | Japan . |
| 52-156625 | 12/1977 | Japan . |
| 53-12330 | 2/1978 | Japan . |
| 53-145620 | 12/1978 | Japan . |
| 53-145621 | 12/1978 | Japan . |
| 53-145622 | 12/1978 | Japan . |
| 62-115430 | 5/1987 | Japan . |
| 62-115431 | 5/1987 | Japan . |
| 62-115432 | 5/1987 | Japan . |
| 62-189456 | 8/1987 | Japan . |
| 62-189457 | 8/1987 | Japan . |
| 63-138340 | 6/1988 | Japan . |
| 63-178222 | 7/1988 | Japan . |

*Primary Examiner*—Joseph Mancuso
*Attorney, Agent, or Firm*—Sughrue, Mion, Zinn, Macpeak & Seas

[57] ABSTRACT

An exposure determination method for determining exposure by extracting feature image data including person's face data. A color original image is divided into many picture elements, each picture element is resolved into three colors of red, green, and blue to photometrically measure them, a histogram of hue values is obtained in accordance with the data obtained through photometry, and the obtained histogram is divided into mountains. Picture elements are classified into groups corresponding to the divided mountains by judging which divided mountain each picture element of the color original image belongs to, the color original image is divided for each group, and at least one of the divided regions is selected to extract the data for the selected region as feature image data. Then, exposure for a copying material is determined in accordance with the extracted feature image data.

16 Claims, 13 Drawing Sheets

METHOD OF DETERMINING EXPOSURE

BACKGROUND OF THE INVENTION

1. Field of the Invention

The present invention relates to an exposure determination method and a person's face data extraction method, more particularly to a method for extracting feature image data such as data for density of person's face, which is used to copy a color original image to a color or black-and-white copying material and the exposure determination method for determining an exposure by using the extracted data.

2. Description of the Related Art

A portion most remarked for appreciation of a portrait is the face of the person. To finish a high-quality photo, it is necessary to print the person's face with a proper color.

Conventionally, the face region in the original image of a color film is specified by a light pen to extract the data for the density of a person's face and an exposure is determined so that the face color is properly printed according to the extracted density data. This type of art is disclosed in the official gazettes of Japanese Patent Application Laid-Open Nos. 62-115430, 62-115431, 62-1-15432, 62-189456, 62-189457, 63-138340, and 63-178222.

However, the above related art has a problem that printing requires a lot of time because the operator has to specify the face region for each image by a light pen. Moreover, it is difficult to realize automation because the operator has to visually specify the face region.

Official gazettes of Japanese Patent Application Laid-Open Nos. 52-156624, 52-156625, 53-12330, 53-145620, 53-145621, and 53-145622 disclose the following method for extracting the data for person's face by extracting flesh-color data.

That is, an color original image is divided into many photometric points, each photometric point is resolved into three colors of R (red), G (green), and B (blue) and photometrically measured, and it is judged if the color of each photometric point calculated from photometric data is kept within the flesh-color range.

Then, a cluster (group) of the photometric points decided as a color within the flesh-color range is used for face density data. For this method, however, because colors within the flesh-color range are assumed as face density data, flesh color of ground, trunk of a tree, and clothes, or portions other than face having a color close to flesh color are extracted as face density data. Moreover, when the same object is photographed under the same condition, it may not be possible to automatically extract face density data if the type of film differs because the color tone differs in photographed images. Further more, when the color of a light source for illuminating an object differs, it may not be possible to automatically extract face density data if the color of the light source differs because the color tone of a photographed image differs (for example, an image photographed by using a fluorescent light for the light source shows green tone).

To solve the problem caused by the difference of light-source color, it is only necessary to correct the light-source color before extracting photometric data within the flesh-color range. The light source can roughly be classified into sunlight, fluorescent light, and tungsten light. The color tone of sunlight depends on the season and time zone and also on direct or indirect light even if the season and time zone are the same.

Artificial light such as fluorescent light has various color tones because products are diversified. Therefore, it is difficult to correct the light source by specifying the type of light source for each light source. Even if light source correction can completely be performed, it is impossible to avoid extracting flesh color of ground and trunk of a tree or portions with a color close to flesh color. Therefore, it is impossible to take action when the type of film differs.

SUMMARY OF THE INVENTION

The present invention is made to solve the above problem and it is the first object of the present invention to provide an exposure determination method for determining an exposure by automatically extracting only feature image data such as person's face data from the color original image on a negative film or the like at a high accuracy.

It is the second object of the present invention to provide a person's face data extraction method for automatically extracting only person's face data from a color original image on a negative film or the like at a high accuracy.

To achieve the above objects, the exposure determination method of the first invention divides a color original image into many picture elements to resolve each picture element into three colors of red, green, and blue and photometrically measure them, the histogram of hue values is obtained in accordance with the data obtained from photometry, the obtained histogram is divided into mountains, picture elements are classified into groups corresponding to the divided mountains by judging which divided mountain each picture element of the color original image belongs to, the color original image is divided for each group, at least one of the divided regions is selected to extract the data for the selected region as feature image data, and the exposure for a copying material is determined in accordance with the extracted feature image data.

This invention makes it possible to determine exposure by obtaining a two-dimensional histogram on hue values and saturation values in accordance with the data obtained through photometry and dividing the obtained two-dimensional histogram into mountains.

For the person's face data extraction method of the second invention, data for a region decided as a person's face is extracted by dividing a color original image into many picture elements to resolve each picture element into three colors of red, green, and blue and photometrically measure them, obtaining a histogram of hue values in accordance with the data obtained through photometry, classifying picture elements into groups corresponding to the divided mountains by judging which divided mountain each picture element of the color original image belongs to, dividing the color original image for each group, and judging at least one of the contours and the internal structures of each divided region to decide whether it is a person's face or not.

This invention also makes it possible to extract person's face data by obtaining a two-dimensional histogram of hue values and saturation values in accordance with the data obtained through photometry instead of the histogram of hue values and dividing the obtained two-dimensional histogram into mountains.

Moreover, it is possible to determine exposure for a copying material in accordance with the extracted person's face data.

It is also possible to extract the data for the region decided as a person's face as person's face data by selecting one of the above divided regions and judging if the selected region is a person's face in accordance with the shape of regions around the selected region.

For the present invention, a color original image is divided into many picture elements to resolve each picture element into three colors of red, green, and blue and photometrically measure them, and a histogram of hue values is obtained in accordance with the data obtained through photometry. Then, the obtained histogram is divided into mountains by separating them at the trough or the foot of the mountain. Thereby, the hue value range of each mountain can be specified. Then, it is decided which divided mountain each picture element belongs to by judging which hue value range the hue value of each picture element belongs to and many picture elements are classified into groups (clusters) corresponding to the divided mountains. Then, the color original image is divided into regions corresponding to the divided groups. In this case, though picture elements included in the same region may be divided into different regions, picture elements included in different groups are not included in the same region. Therefore, the color original image is divided for each region including picture elements having hue values within the hue value range divided by the histogram.

Resultingly, picture elements with hue values kept within the predetermined range are included in one region on the color original image. Thus, feature image data can be extracted by selecting at least one region showing the feature of the image because the data for the selected region shows feature image data.

The color tone of color original image is uniformly changed in the whole screen due to difference of the type of film or light source, change of film characteristic with time, or difference between developed films. However, divided regions of the color original image are not changed due to change of color tone because groups consisting of picture elements of an image are stored though only the position on the histogram changes even if the color tone changes. Therefore, the present invention makes it possible to extract person's face density data even if the color tone or color range of the color original image changes due to difference of the type of film or light source, change of film characteristic with time, or difference between developed films.

Thus, by determining exposure in accordance with the feature image data extracted by the above procedure and making a print, the feature image portion can be printed with a proper color.

If the color original image is divided in accordance with a histogram of only hue values when the color tone of a feature image which is the featured portion of the image is the same as or close to the color tone of other portion, it may not possible to discriminate the feature image from other portion. Therefore, saturation values are adopted in addition to hue values, a two-dimensional histogram of the hue values and saturation values is obtained, the color original image is divided similarly to the above by diving the two-dimensional histogram into mountains, feature image data is extracted by selecting at least one of the divided regions, and exposure is determined in accordance with the extracted feature image data.

Therefore, by using hue values and saturation values, feature image data can be extracted even if portions having a color tone same as or close to the feature image are mixed.

Because a person's face is most remarked for appreciation of a portrait, it is preferable to judge if a divided region of a color original image is a person's face and extract the data for the region decided as a person's face as feature image data.

In this case, because the person's face is located at a position upper than the body and lower than the head, the person's face can be decided by judging the shape of regions around the selected region to judge if the body and head are present.

Moreover, because the contour of a person's face is completely different from that of other portions and the internal structure of the person's face is completely different from that of other portions, the person's face can be decided by judging at least one of the contours and internal structures of each region.

Though person's face data which is feature image data can be extracted in accordance with a one-dimensional histogram of hue values described above, it can also be extracted in accordance with a two-dimensional histogram of hue values and saturation values described above. The color tone of person's face is similar to that of flesh color portions of ground and tree. However, the saturation of a person's face is different from that of the ground or a tree in most cases. Therefore, a person's face data can also be extracted from an image in which a person's face is mixed with portions of the ground and trees with the color tone the same as or close to that of the person's face by extracting person's face data in accordance with the two-dimensional histogram of hue values and saturation values.

For the present invention, the data to be extracted as feature image data can use data other than person's face data.

As described above, the present invention makes it possible to extract feature image data such as person's face data at a high accuracy even if the color tone or color range of a color original image changes due to difference of the type of film or light source, change of film characteristic with time, or difference between developed films because feature image data is extracted in accordance with a histogram of hue values and thereby improve the color repeatability of feature image.

Moreover, because feature image data is extracted in accordance with a two-dimensional histogram of hue values and saturation values, the present invention makes it possible to extract feature image data even if portions with the color tone same as or close to a feature image such as a person's face are mixed and thereby improve the color repeatability of the feature image.

DETAILED DESCRIPTION OF THE PREFERRED EMBODIMENTS

Figure 1:
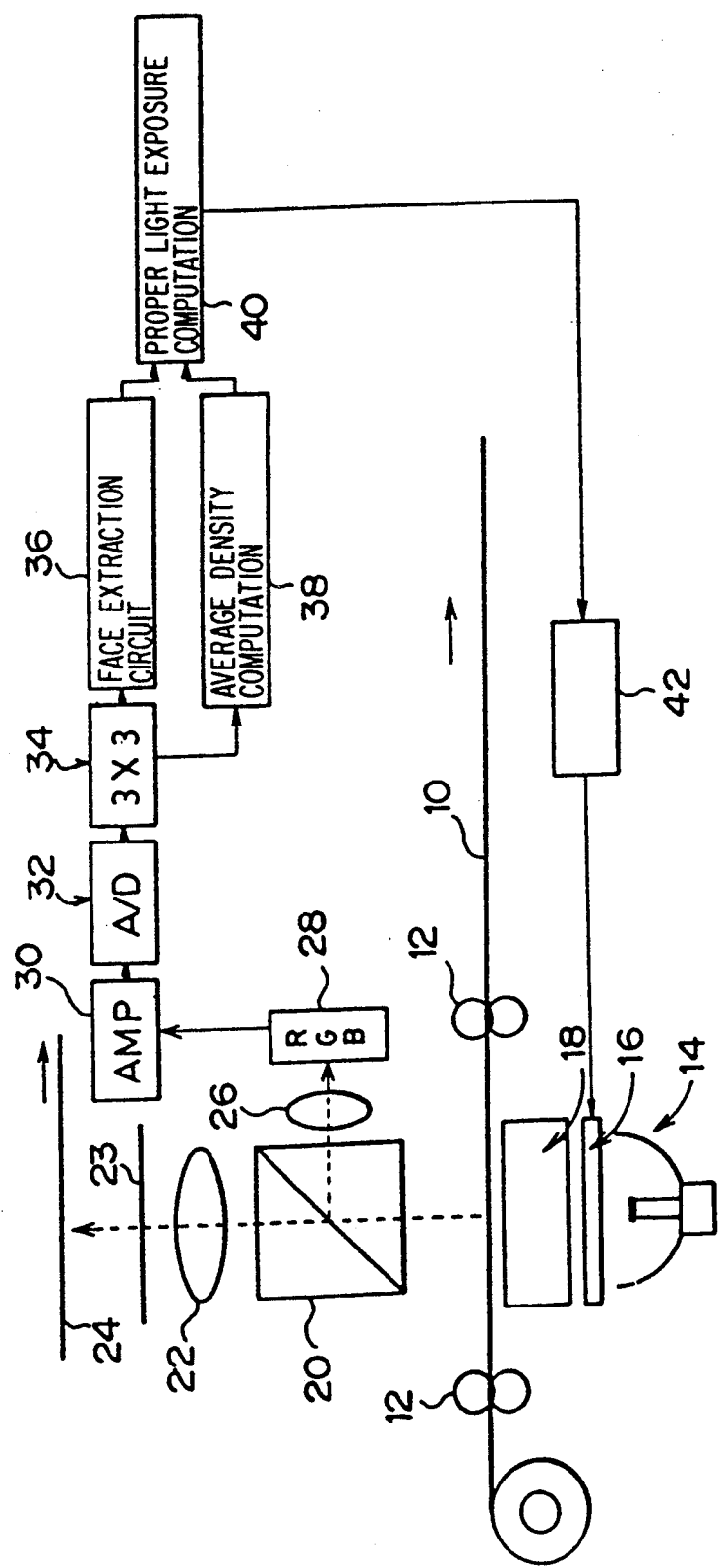
FIG. 1 is a schematic diagram showing the printer which is the first embodiment of the present invention.

An embodiment of the present invention is described below by referring to the drawings. The embodiment is made by applying the present invention to an automatic printer. As shown in FIG. 1, the automatic printer of this embodiment has carrying roller's 12 for carrying a color negative film 10. A light source 14, color correction filter 16 such as a color modulation filter, and diffusion box 18 are arranged in order under the negative film 10 to be carried by the carrying rollers 12. A distribution prism for distributing the ray transmitted through the negative film 10 in two ways is arranged above the negative film 10. A projective optical system 22, black shutter 23, and color paper (photographic paper) 24 are arranged in order on one optical path distributed by the distribution prism 20, and a projective optical system 26 and a CCD image sensor 28 are arranged in order on the other optical path. The CCD image sensor 28 divides one full screen (one frame) of the negative film 10 into many picture elements (e.g. 256×256 picture elements) and resolves each picture element into three colors of R (red), G (green), and B (blue) to photometrically measure them. The CCD image sensor 28 is connected to a 3×3 matrix circuit 34 for correcting the sensitivity of the CCD image sensor through an amplifier 30 for amplifying the CCD image sensor output and an analog-to-digital (A-D) converter 32.

The 3×3 matrix circuit 34 is connected to a proper exposure computation circuit 40 through a face extraction circuit 36 consisting of a microcomputer storing the program of a routine to be described later and through an average density computation circuit 38 for computing the average density of one full screen. The proper exposure computation circuit 40 is connected to the color correction filter 16 through a driver 42 for driving the color correction filter,.

The following is the description of functions of this embodiment. The ray emitted from the light source 14 passes through the color correction filter 16, diffusion box 18, and color negative film 10, and is distributed by the distribution prism 20 and received by the CCD image sensor 28. In this case, the black shutter 28 is closed. When the CCD image sensor 28 receives the ray, it divides one full screen into many picture elements, resolves each picture element into three colors of R, G, and B to photometrically measure them, and outputs a photometric data signal. The photometric data signal is amplified by the amplifier 30 before it is converted into a digital signal by the A-D converter 32. Then, the sensitivity of the image sensor is corrected by the 3×3 matrix circuit 34 and the digital signal is inputted to the face extraction circuit 36 and the average density computation circuit 38. The average density computation circuit 38 computes the average density of one full screen. The face extraction circuit 36, as described later, estimates the portion of a person's face in one screen and outputs three-color photometric data for R, G, and B. The exposure computation circuit 40 computes an exposure by using the three-color photometric data outputted from the face extraction circuit 36 and the average density obtained by the average density computation circuit 38, controls the color correction filter 16 through the driver 42, and performs printing by operating the black shutter 23. The exposure correction value for the average density can be obtained by using the average density obtained by the average density computation circuit 38. Unless the exposure correction value is obtained, the average density computation circuit 38 is not always necessary and it is possible to directly obtain an exposure from the three-color photometric data outputted by the face extraction circuit 36.

Figure 2:
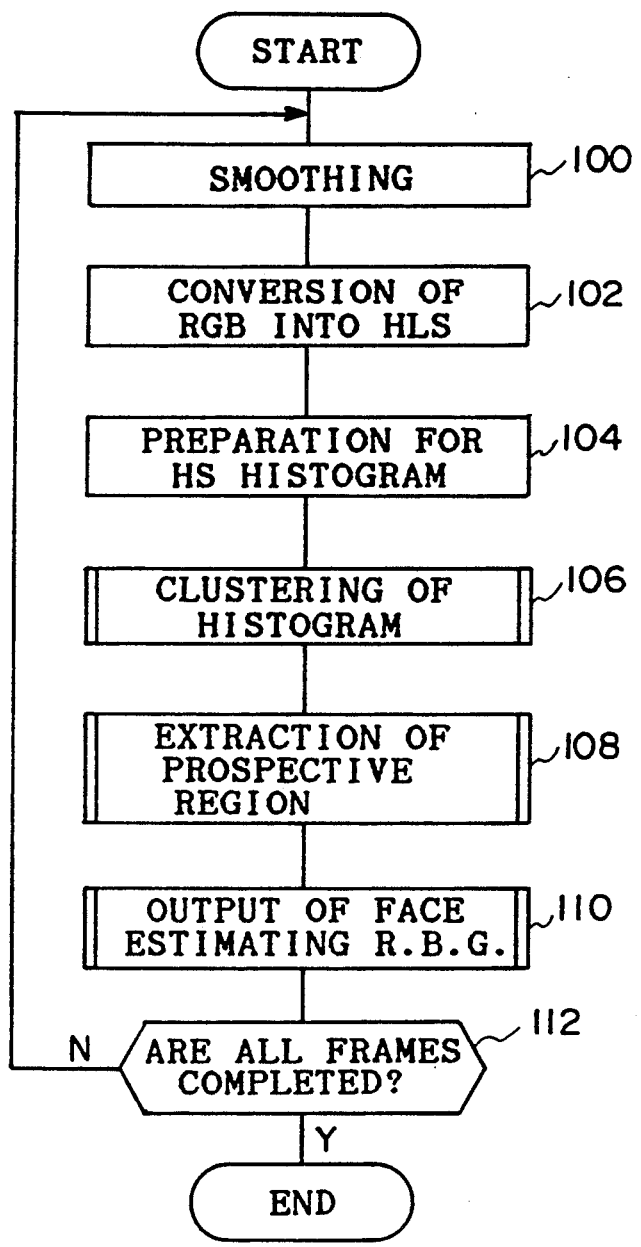
FIG. 2 is a flow chart showing the face extraction routine of a face extraction circuit.

FIG. 2 shows a face extraction routine by the face extraction circuit 36, in which elimination of noise from inputted three-color photometric data, that is, smoothing is executed in the step 100. In the next step 102, three-color photometric data for R, G, and B is converted into H (hue value), L (lightness value), and S (saturation value) according to the following equations.

$$L = (R + G + B)/3 \quad (1)$$

$$S = 1 - min(r', g', b') \quad (2)$$

$$H = H'/2Pi \quad (3)$$

Figure 3:
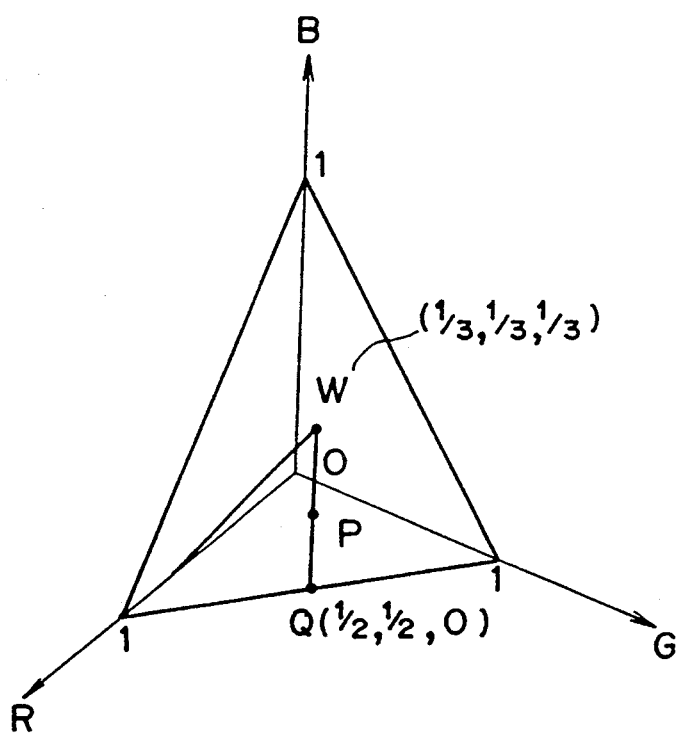
FIG. 3 is a diagram showing color coordinates.

Where, R, G, and B are three-color photometric data specified so that the minimum value is 0 and the maximum value is 1 respectively as shown in the three-dimensional coordinates in FIG. 3; "min ( )" is the minimum value of the values in parentheses; and r', g', and b' represent r'=R/L, g'=G/L, and b'=B/L. H' is given by the following expression (4) and Pi ("i" is one of R, G, and B) is P in FIG. 3.

$$H' = \frac{Pi}{2} - \tan^{-1}\frac{x}{1-x^2} \quad (4)$$

where, $$x = \frac{2(R-L)^2 + (G-L)^2 + (B-L)^2}{6L(R-L)^2 + (G-L)^2 + (B-L)^2}$$

Figure 4A:
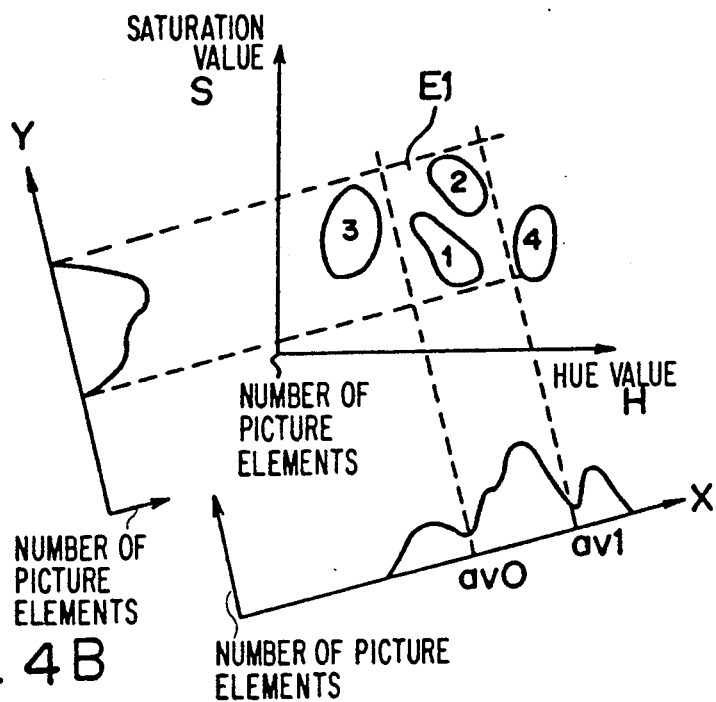
FIG. 4A is a diagram showing a two-dimensional histogram of hue values and saturation values.

In the step 104, a two-dimensional histogram of hue values and saturation values is obtained by using a coordinate system consisting of the hue value axis, saturation value axis, and number-of-picture-element axis which are perpendicular to each other as shown in FIG. 4A. In the step 106, as described later, the obtained two-dimensional histogram is divided into mountains, that is, the two-dimensional histogram is clustered. In the next step 108, many picture elements are clustered in accordance with the mountains of the clustered two-dimensional histogram and a screen is divided in accordance with the clustering to extract a prospective region for a person's face among the divided regions.

In the next step 110, the region of a face is estimated from the region extracted as a prospect of the face and three-color photometric data for R, G, and B of the region estimated as the face is outputted. In the step 112, it is judged if all frames are printed. If so, the routine is completed.

Figure 5:
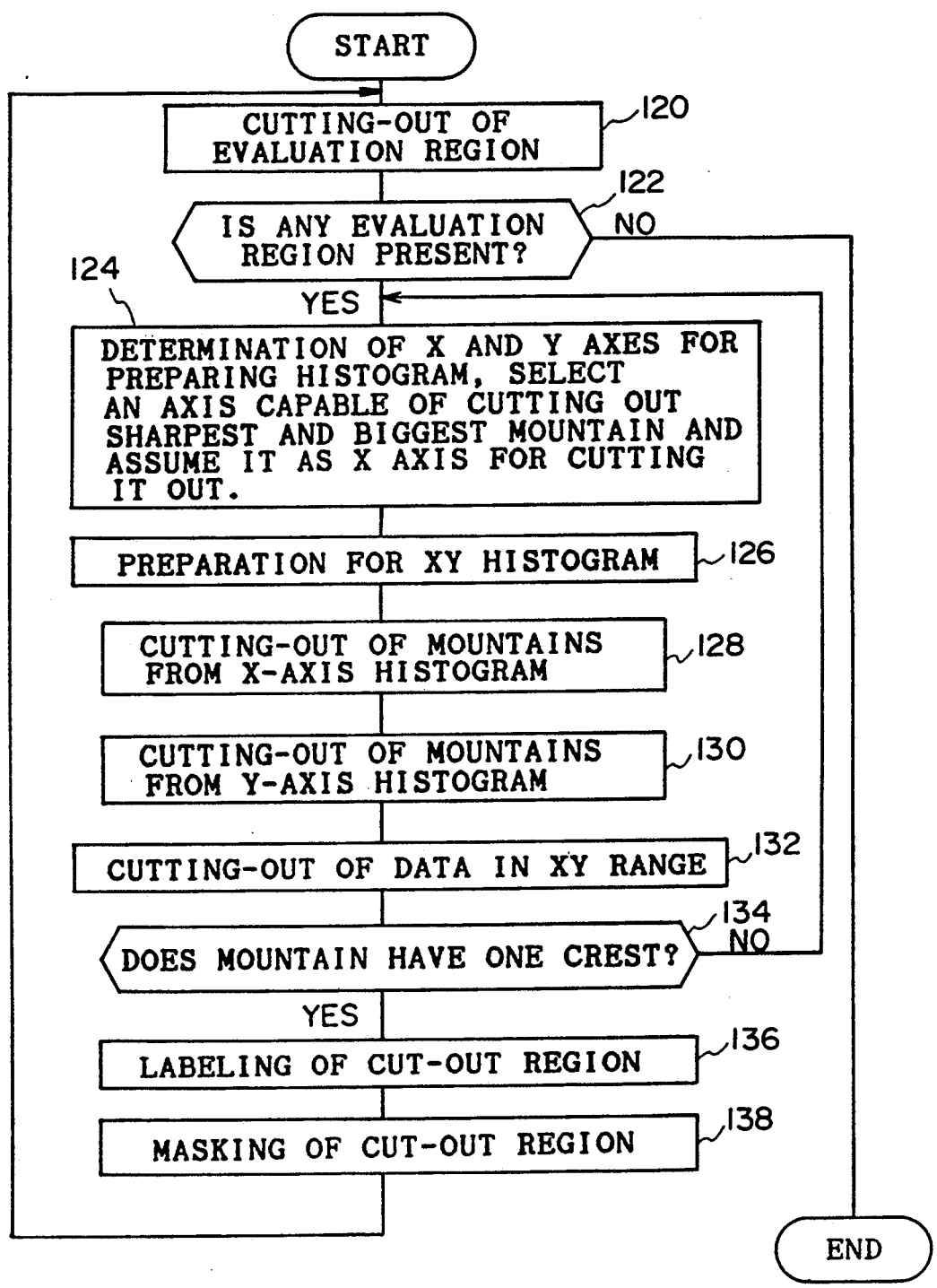
FIG. 5 is a diagram showing details of the step 106 in FIG. 2.

The following is the description of details of the above steps 106 through 110. FIG. 5 shows details of the step 106. In the step 120, a region to be evaluated is cut out of the two-dimensional histogram of hue values and saturation values. In FIG. 5, one frame is used as an evaluation region to simplify explanation. In the step 122, it is judged if any evaluation region is present. When the evaluation region cannot be cut out in the step 120, that is, when evaluation of all regions is completed, the routine is completed because no evaluation region is present. When any evaluation region is present, X and Y axes are determined to make a histogram for cutting out mountains in the step 124. That is, the evaluation region is rotated around the axis parallel to the number-of-picture-element axis to obtain a position where priority is given to multi-crest property and the mountains become sharpest when viewing mountains of the histogram from the side and determine the X and Y axes on the basis of the position. When the processing time should be decreased, it is possible to use either X or Y axis in which the variance of the histogram is maximized though the accuracy slightly decreases. For the example in FIG. 4A, the position where priority is given to multi-crest property and mountains become sharpest when viewing four mountains marked with numerals 1 through 4 from the side is the position where three mountains can be seen. Therefore, X axis is determined in the direction perpendicular to the direction when they can be seen and Y axis is determined in the direction perpendicular to the X axis.

In the next step 126, each one-dimensional histogram is made by projecting the two-dimensional histogram on X and Y axes. For the example in FIG. 4A, when viewing the mountains from the direction perpendicular to X axis, three mountains including the mountain marked with the numerals 3, the mountain marked with numerals 1 and 2, and the mountain marked with numeral 4 appear in the one-dimensional histogram about X axis because the mountains marked with numerals 1 and 2 are overlapped to become one mountain. When viewing the mountains from the direction perpendicular to X axis, one mountain appears in the one-dimensional histogram about Y axis because the mountains marked with numerals 1 through 4 are overlapped to become one mountain. In the next step 128, the histogram is converted into a performance function H (a) by the following expression (5) and mountains are cut out of the histogram about X axis in accordance with the performance function.

$$H(a) = \Sigma \frac{2f(a) - f(a + x) - f(a - x)}{x} \quad (5)$$

Where, "f (a)" is the number of picture elements when the value (feature value) in X-axis direction is "a" and "x" is the deviation from the feature value "a".

That is, the average value T of the performance function H (a) is obtained and the range (trough and foot existing range) lower than the average value T of the performance function H (a) is obtained. Then, the position where the histogram within this range is minimum is obtained as the trough or foot of the histogram. Then, the histogram is cut out at the obtained trough or foot.

Figure 6:
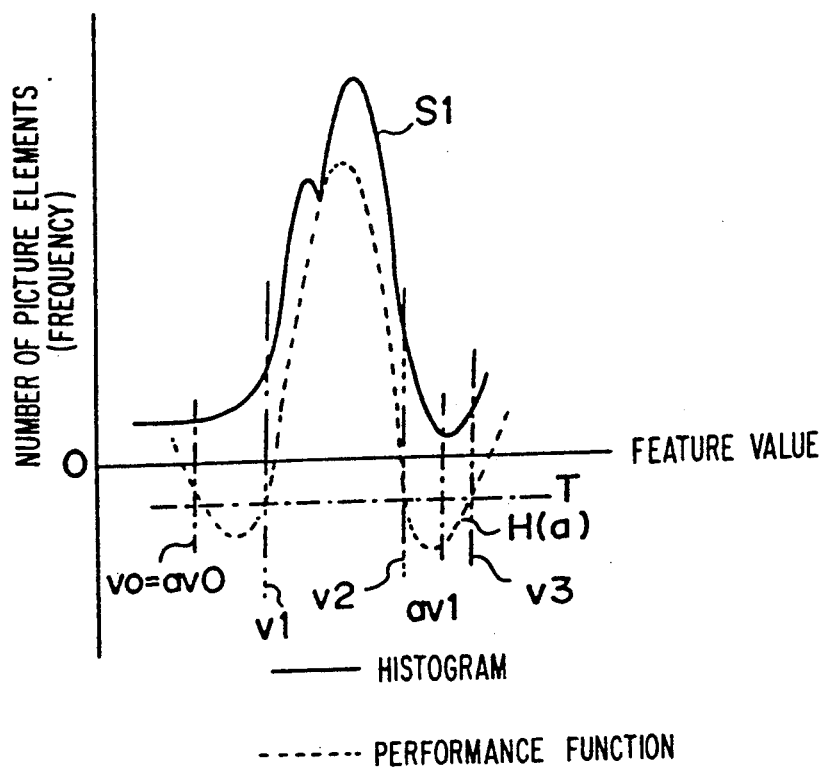
FIG. 6 is a diagram showing a histogram and a performance function.

The following is the description of cutting out the above mountain by referring to FIG. 6. The broken line in FIG. 6 represents the performance function H (a) obtained from the histogram shown by the continuous line S1. The range in which the performance function H (a) is equal to or lower than the average value T about the negative portion is the range in which the feature value ranges between v0 and v1 and between v2 and v3. The position where the frequency of the histogram within this range is minimized is av0=v0 for the range between v0 and v1 and av1 for the range between v2 and v3, and avO is obtained as a foot and av2 is obtained as a trough. The histogram is cut out at these positions.

In the step 130, mountains of the histogram about Y axis are cut out similarly to cutting-out of mountains of the histogram about X axis. In the next step 132. A region where mountains of the one-dimensional histogram about X and Y axes cut out in the above manner on the two-dimensional histogram are overlapped is obtained to cut mountains out of the two-dimensional histogram of hue values and saturation values. The region E1 in FIG. 4A shows the mountains cut out in the above manner.

Figure 4B:
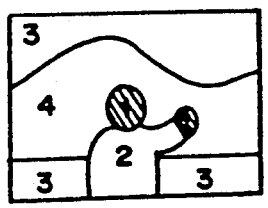
FIG. 4B is a diagram showing a divided original image.
Figure 4C:
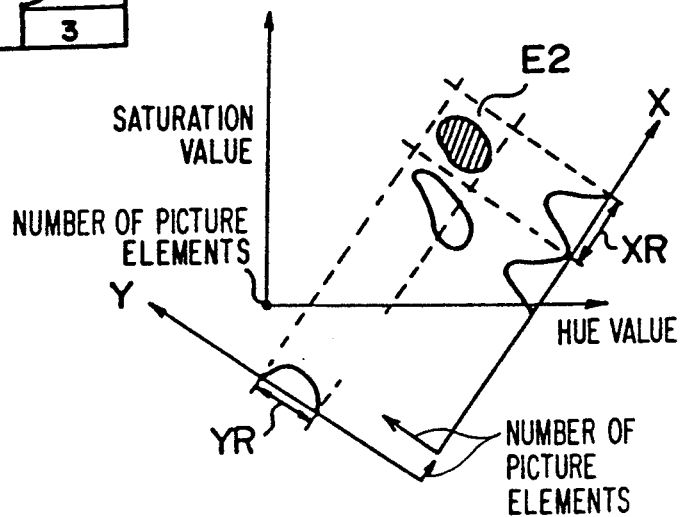
FIG. 4C is a diagram showing the single mountain with one crest extracted from the two-dimensional histogram.

In the next step 134, it is judged if the mountain cut out of the two-dimensional histogram has one crest. If not, Steps 124 through 134 are repeated until the mountain cut out of the two-dimensional histogram has one crest. The region E2 in FIG. 4C shows the one-crest mountain cut out in the above manner.

In the next step 136, the processing for providing cut-out one-crest mountains with a label to identify them (i.e. labeling) is performed. In the step 138, labeled mountains are masked to restart the step 120. The above steps are repeated to divide all regions of the two-dimensional histogram of hue values and saturation values into one-crest mountains.

Figure 7:
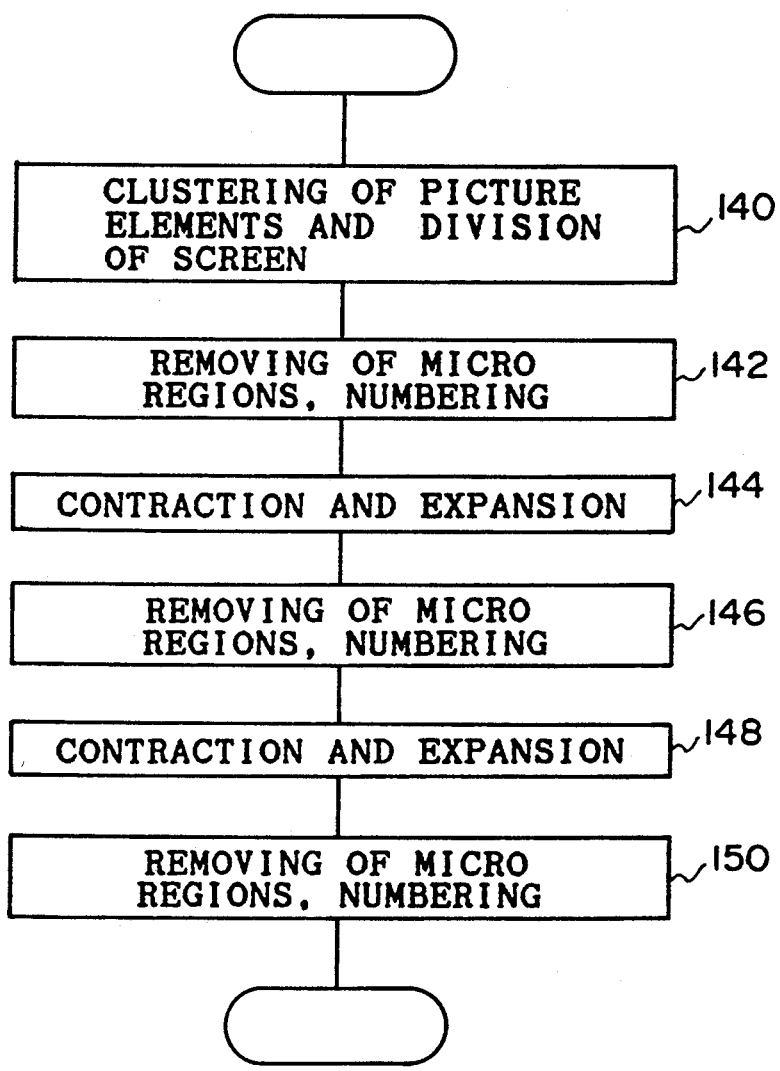
FIG. 7 is a diagram showing details of the step 108 in FIG. 2.

FIG. 7 shows the details of the step 108. In the step 104, the X-axis directional range XR {FIG. 4C} of one-crest mountains divided in the above manner and the Y-axis directional range YR {FIG. 4C} of them are obtained for each one-crest mountain, it is judged about each picture element of the original image if hue values and saturation values are kept within these ranges in order to cluster picture elements, and the picture elements enclosed by the ranges XR and YR are collected to divide the original image so that the collected picture elements form one region on the original image. The divided regions are numbered. FIG. 4B shows a divided original image, in which the picture elements in regions marked with numerals 1 through 4 correspond to the picture elements enclosed by one-crest mountains marked with numerals 1 through 4. The picture elements belonging to the same one-crest mountain in FIG. 4A are divided into different regions in FIG. 4B. This is because the picture elements having the hue value range and saturation value range of one-crest mountain in FIG. 4A are located in different regions in FIG. 4B.

In the next step 142, micro regions are removed and numbering is retried by judging the area of divided regions. In the next step 114, small regions connected with a large region are separated from the large region by executing contraction for removing all picture elements at the boundary between regions to remove one layer and expansion for increasing picture elements at the boundary in the background picture element direction to add one layer contrary to contraction.

In the next step 146, numbering is executed by removing micro regions similarly to the step 142 and contraction and expansion similar to the above are executed to separate regions slightly bonded in the step 148 from each other. In the step 150, removal of micro regions and numbering are executed similarly to the above.

Figure 8:
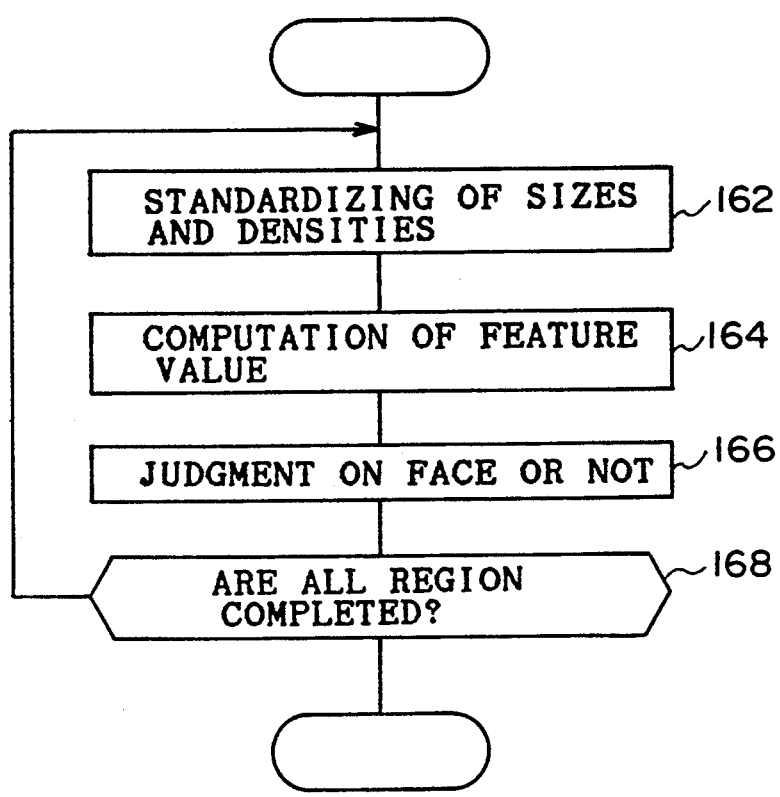
FIG. 8 is a diagram showing details of the step 110 in FIG. 2.

FIG. 8 shows the details of the step 110. In the step 162, one region is selected as a remarked region among the regions extracted by the routine in the step 108 or FIG. 7, the size of the remarked region is standardized by expanding and contracting the remarked region so that the horizontal- and vertical-fillet diameters of the remarked region will have the predetermined value, and the density or brightness value is standardized in accordance with the following expression (6).

$$d_r = \frac{d_s}{d_{max} - d_{min}} \cdot (d - d_{min}) \quad (6)$$

Where,
dmax: Maximum density value (or brightness value) in region
dmin: Minimum density value (or brightness value) in region
ds: Full-scale density value (or brightness value) of image sensor
dr: Standardized density value (or brightness value)

In the step 164, the correlation coefficient "gamma" of the remarked region for previously stored several types (ten types for this embodiment) of standard face images (e.g. face images viewed from the front, viewed from the side (right and left respectively), turned downward, and turned upward) is computed by the following expression (7) and the correlation coefficient is assumed as the feature value. These standard face images can be the data for only the contour of face or the data obtained by adding the data for internal structures of face (e.g. eyes, nose, and mouth) to the data for the contour of face.

$$r = \frac{\sigma_{fg}}{\sigma_f \sigma_g} \quad (7)$$

where, $$\sigma_{fg} = \frac{1}{T^2} \sum_x \sum_y f(x, y) \, g(x, y) -$$

$$\frac{1}{T^2} \sum_x \sum_y f(x, y) \cdot \frac{1}{T^2} \sum_x \sum_y g(x, y)$$

$$\sigma_f = \left\{ \frac{1}{T^2} \sum_x \sum_y (f(x, y))^2 - \frac{1}{T^2} \sum_x \sum_y (f(x, y))^2 \right\}^{\frac{1}{2}}$$

$$\sigma_g = \left\{ \frac{1}{T^2} \sum_x \sum_y (g(x, y))^2 - \frac{1}{T^2} \sum_x \sum_y (g(x, y))^2 \right\}^{\frac{1}{2}}$$

T represents the horizontal- and vertical-fillet diameters of image (both fillet diameters are the same in this case), "f (x, y)" represents the remarked region, and "g (x, y)" represent the standard face image.

In the step 166, it is judged whether or not the remarked region is a person's face through the linear discrimination analysis using the above feature value as a variable and R-, G-, and B-photometric data for the region decided as a face is outputted to the proper exposure computation circuit 40. In the step 168, it is judged if the decision on whether or not all extracted regions belong to a face is completed. If not, the steps 162 through 168 are repeated.

In the above case, the correlation coefficient is used as the feature value for the judgement on a person's face. However, it is also possible to use the invariant, autocorrelation function, or geometrical invariant obtained from the central moment.

When assuming the (p+q)-degree central moment "$mu_{pq}$" of the image "f (x, y)" around the center of gravity as:

$$\mu_{pq} = \sum_x \sum_y (x - \bar{x})^p (y - \bar{y})^q f(x, y)$$

Where, $$\bar{x} = \frac{m_{10}}{m_{00}}$$

$$\bar{y} = \frac{m_{01}}{m_{00}}$$

$$m_{pq} = \sum_x \sum_y x^p y^q f(x, y)$$

$$(p, q = 0, 1, 2 \ldots)$$

The normalized central moment "$eta_{pq}$" around the center of gravity is shown as follows:

$$\eta_{pq} = \frac{\mu_{pq}}{(\mu_{00})^\gamma}$$

Where,
$\gamma = (p+q+2)/2$
$p+1 = 2, 3, \ldots$

From the above, the following seven invariants "Psi-i" (i=1, 2, ..., and 7) are obtained from the secondary and tertiary normalized central moments around the center of gravity.

$\phi_1 = \eta_{20} + \eta_{02}$ $\phi_2 = (\eta_{20} - \eta_{02})^2 + 4 \eta_{11}^2$ $\phi_3 = (\eta_{30} - 3 \eta_{12})^2 + (3 \eta_{21} - \eta_{03})^2$ $\phi_4 = (\eta_{30} + \eta_{12})^2 + (\eta_{21} + \eta_{03})^2$ $\phi_5 = (\eta_{30} - 3 \eta_{12})(\eta_{30} + \eta_{12}) [(\eta_{30} + \eta_{12})^2 - 3(\eta_{21} + \eta_{03})^2] +$ $(3 \eta_{21} - \eta_{03})(\eta_{21} + \eta_{03}) \times [3(\eta_{30} + \eta_{12})^2 - (\eta_{21} + \eta_{03})^2]$ $\phi_6 = (\eta_{20} - \eta_{02}) [(\eta_{30} + \eta_{12})^2 - (\eta_{21} + \eta_{03})^2] +$ $4 \eta_{11} (\eta_{30} + \eta_{12}) (\eta_{21} + \eta_{03})$ $\phi_7 = (3\eta_{21} - \eta_{03})(\eta_{30} + \eta_{12}) [(\eta_{30} + \eta_{12})^2 - 3(\eta_{21} + \eta_{03})^2] +$ $(3\eta_{12} - \eta_{30})(\eta_{21} + \eta_{03}) \times [3(\eta_{30} + \eta_{12})^2 - (\eta_{21} + \eta_{03})^2$ The autocorrelation function Rf is expressed as follows:

$$R_f = \sum_x \sum_y f(x, y) f(x + s, y + t)$$

And the geometrical invariant feature value is expressed as follows:

$$X_f = \sum_x \sum_y f(x, y) f(x + s, y + t) f(x + u, g + u)$$

The proper exposure computation circuit 40 computes the proper exposure Ei in accordance with the following expression by using the R-, G-, and B-photometric data for the face region extracted by the face extraction circuit 36 in the above manner and the one-frame average density Di (i=any one of R, G, and B) computed by the average density computation circuit 38 and outputs Ei to the driver 42. The driver 42 computes an exposure control value with the proper exposure Ei to control the color modulation filter 16.

$$\log E_i = LM_i \cdot CS_i \cdot (DN_i - D_i) + PB_i + LB_i + MB_i + NB_i + K_i + K_2 \quad (8)$$

Where,

LM: Magnification slope coefficient which is previously set in accordance with the enlargement ratio determined by the type of negative and the print size CS: Color slope coefficient prepared for each type of negative, which includes the under- and over-exposure types.

It is decided whether the average density of the frame to be printed is under or over the standard negative density before the under- or over-exposure type is selected.

DN: Standard negative density value
D: Average density value of print frame
PB: Correction balance value for standard color paper, which is determined in accordance with the type of the color paper
LB: Correction balance value for standard printing lens, which is determined in accordance with the type of the printing lens
MB: Correction value (master balance value) for fluctuation of the printing light source or change of paper developing performance
NB: Negative balance (color balance) value determined by the characteristic of negative film
K2: Color correction value
K1: Density correction value shown by the following expression $$K_a \left( \frac{D_R + D_G + D_B}{3} - \frac{FD_R + FD_G + FD_B}{3} \right) + K_b$$

Where, Ka and Kb are a constant and FD is the average density of face region.

It is also possible to express the color correction value K2 by assuming the density correction value K1 in the above expression (8) as the correction value obtained by a film tester and using the average density of face region as shown below.

$$(K_2)_i = K_c \left\{ \left( FD_i - \frac{FD_R + FD_G + FD_B}{3} \right) - \left( DN_i - \frac{DN_R + DN_B + DN_G}{3} \right) \right\}$$

Where, Kc is a constant.

Moreover, it is possible to obtain an exposure by assuming the density correction value K1 and color correction value K2 in the above expression (8) as the correction value obtained by the film tester and replacing the average density Di of the print frame in the expression (8) with the average density FDi of face region.

Because this embodiment makes judgment by using the contour and internal structure of a region, face data can also be extracted from an image in which a face, ground, and tree having similar hue are mixed.

Figure 9:
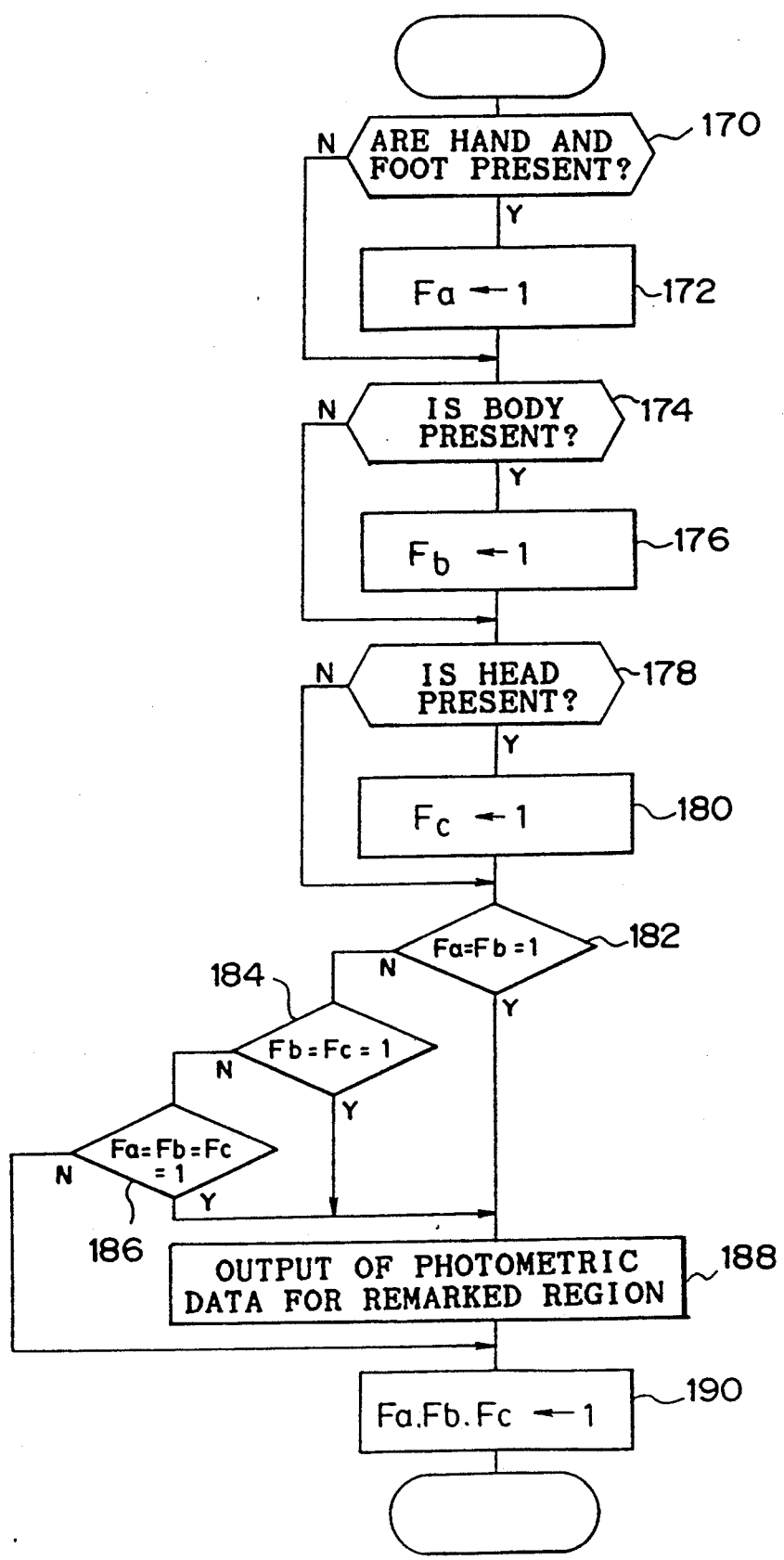
FIG. 9 is a flow chart of the face extraction routine of the second embodiment of the present invention.

The second embodiment of the present invention is described below. This embodiment judges whether the remarked region is a face or not on each prospective region extracted in the step 108 by using the shape and color information of the remarked region and those of adjacent regions which are located around the remarked region. FIG. 9 shows the routine for judging a face or not. In the step 170, it is judged whether or not a region corresponding to the hand or foot of a person is extracted by judging if a region which has the hue value and saturation value same as or close to those of the remarked region around the remarked region and whose size (capable of adopting, for example, horizontal or vertical fillet diameter) is 25 to 100% of that of the remarked region is extracted. The range to be judged should be a range in which the body of a person is present, in order words, a range having the radius five times as large as the diameter of the circle with the same area as that of the remarked region. If image information is discontinued, the objective range should be up to the position where image information is discontinued in the discontinuous direction. When a region corresponding to the hand or foot is present around the remarked region, the flag Fa is set in the step 172.

In the next step 174, it is judged whether or not a region of the body of a person is extracted by judging if a region connected with the remarked region is present and the region corresponds to the body of the person. Because the body of a person is normally symmetric to the axis for the right and left and asymmetric for the top and bottom and connects with his face, it is possible to decide whether or not the region corresponding to the body of the person is present by judging if a region connected with the remarked region is present and it is symmetric to the axis for the right and left and asymmetric for the top and bottom. When the region corresponding to the body of the person is present, the flag Fb is set in the step 176.

In the next step 178, it is decided whether or not a head is present by judging the following conditions. The head is adjacent to a face and shows an approximate ellipse when it is combined with the face. Because a cap, helmet, or hair is normally present on the head, the hue or saturation of the head is different from that of the face. Therefore, it is possible to decide whether the head is present or not by judging if the ratio of the peripheral length of a region adjacent to the remarked region to the boundary length at the adjacent portion with the remarked region is 30% or more, the roundness when the remarked region is combined with the adjacent region is improved, the saturation value difference or brightness value difference to the hue difference between the hue value of the remarked region and that of the region adjacent to the remarked region is large, and the saturation value or brightness value of the region adjacent to the remarked region is small than that of the remarked region. When it is decided that the region corresponding to the head is present, the flag Fe is set in the step 180.

In the step 182, it is judged if the flags Fa and Fb are set. If so, in other words, when a region corresponding to the hand or foot is present around the remarked region and the region connected with the remarked region is a region corresponding to the body, it is decided that the remarked region is a person's face and the R-, G-, and B-photometric data for the remarked region is outputted in the step 188. If not in the step 188, it is judged in the step 184 if the flags Fb and Fc are set. If so, in other words, when the region connected with the remarked region is a region corresponding to the body and the region adjacent to the remarked region is a region corresponding to the head, it is decided that the remarked region is a person's face and the step 188 starts. If not in the step 184, it is judged in the step 186 if the flags Fa, Fb, and Fc are set. If so, it is decided that the remarked region is a person's face and the step 188 starts. In the next step 190, the flags Fa, Fb, and Fc are reset in order to decide the remarked region.

To decide whether the remarked region is a hand, foot, body, or head in this embodiment, it is also possible to previously store a plurality of standard hand or foot images, a plurality of standard body images, and a plurality of standard head images and compare the remarked region with these standard images for decision as described in the above first embodiment.

Figure 10:
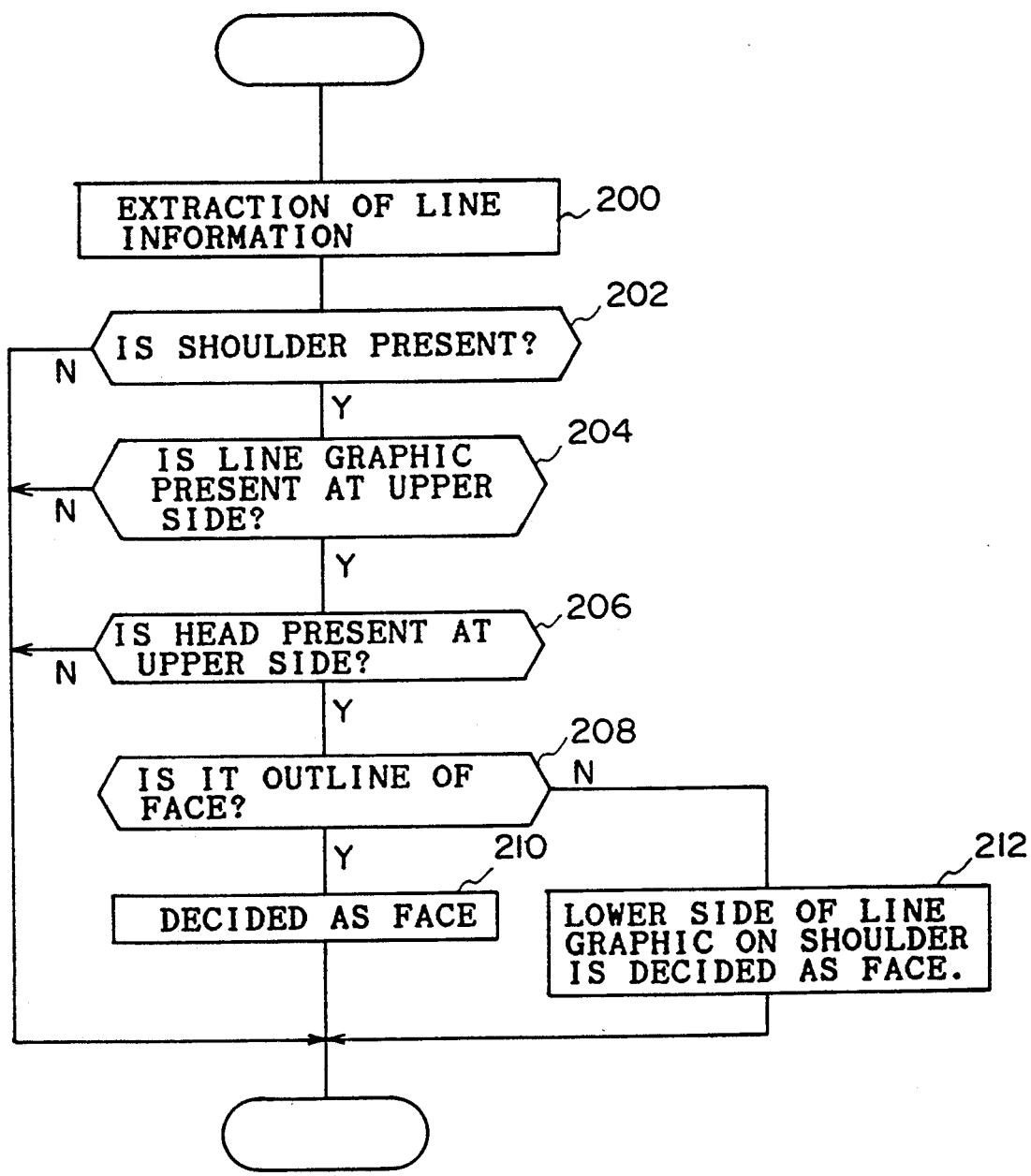
FIG. 10 is a flow chart of the face extraction routine of the third embodiment of the present invention.

The third embodiment of the present invention is described below. This embodiment converts an extracted region into a line graphic to judge whether or not the remarked region is a face in accordance with the shape of regions around the remarked region and that of the remarked region. FIG. 10 shows a face decision routine in accordance with line graphic conversion, in which each region is converted into a ling graphic by extracting line information from the extracted region for one screen in the above manner. In the step 202, it is judged whether or not a line graphic showing the shoulder of a person is present by comparing the previously stored standard line graphic showing the person's shoulder with the line graphics for one screen. Unless the line graphic showing the should is present, this routine is completed. When the line graphic showing the should is present, it is judged if any line graphic is present on the former line graphic. If so, the latter line graphic is assumed as a remarked line graphic to judge if any line graphic showing a head (e.g. cap, hair, or helmet) is present on the top of the remarked line graphic in the step 206. If so in the step 206, the remarked line graphic has a large probability that the remarked line graphic is a face line graphic because the line graphic showing the face is present at the top of the remarked line graphic and the line graphic showing the shoulder is present at the bottom of the remarked line graphic. Therefore, it is judged in the step 208 if the contour of the remarked line graphic is similar to that of the standard face line graphic. If so in the step 208, it is decided in the step 210 that the remarked line graphic is a face and the R-, G-, and B-photometric data for the region corresponding to the remarked line graphic is outputted. If not in the step 208, however, it is decided in the step 212 that the lower portion of the line graphic at the top of the line graphic showing the shoulder is a face and R-, G-, and B-photometric data for the portion is outputted.

For this embodiment, because a face is decided with the shape of the remarked region, face data can also be extracted from an image including a face, ground, and tree with similar hue. Moreover, because a face is not decided by using the microstructure of the face, the face can be decided with a short computation time even if the resolution of the image to be decided is low.

Figure 11:
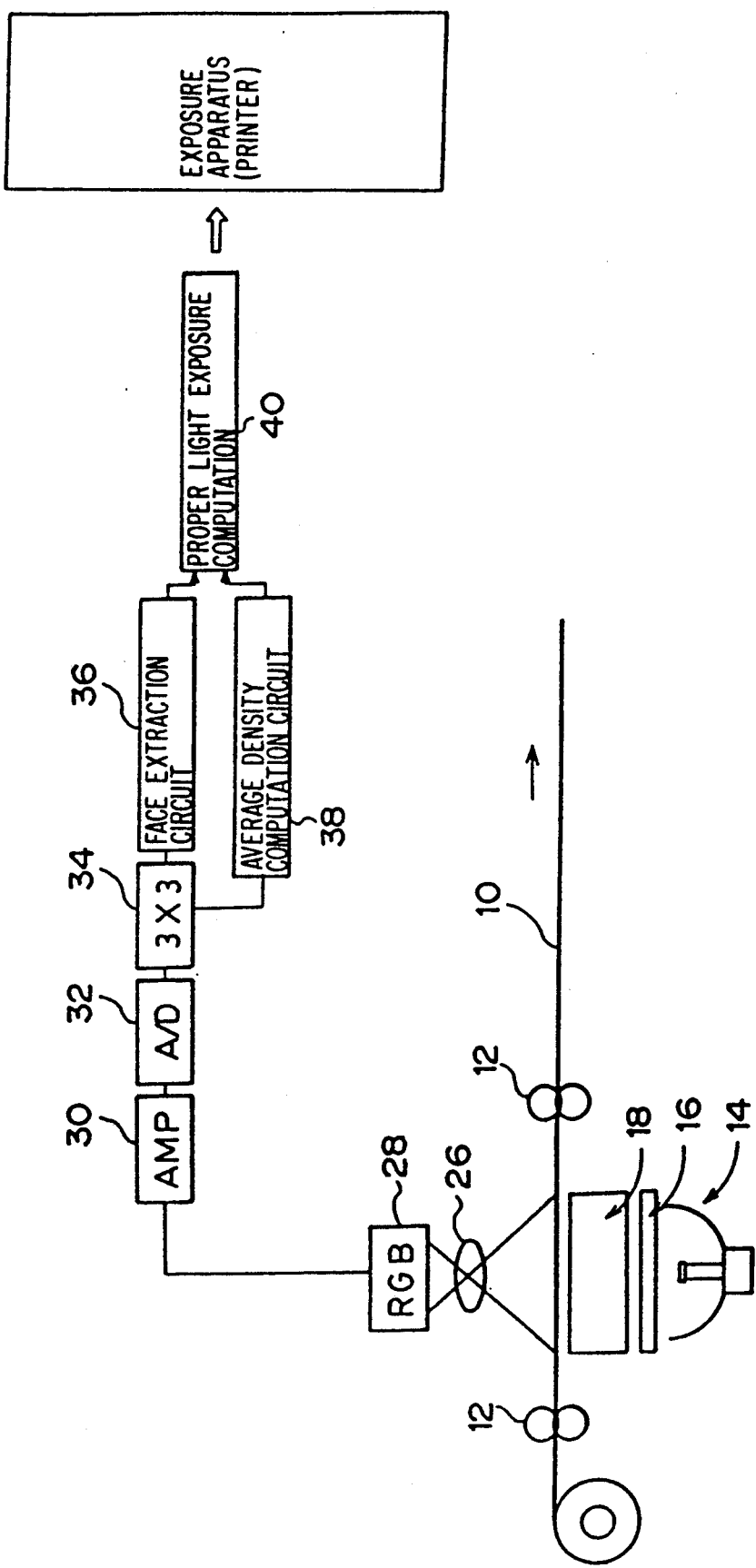
FIG. 11 is a schematic diagram of the exposure amountcomputation unit to which the present invention is applied.

FIG. 11 shows a modification in which the present invention is applied to a exposure determination apparatus separate from a printer or printer processor. In FIG. 11, the portion corresponding to that in FIG. 1 is provided with the same numeral to omit its description. The average density computation circuit 38 is not always necessary. Instead, it is also possible to use an integrating transmission density detection circuit for detecting LATD of the entire screen.

Figure 12:
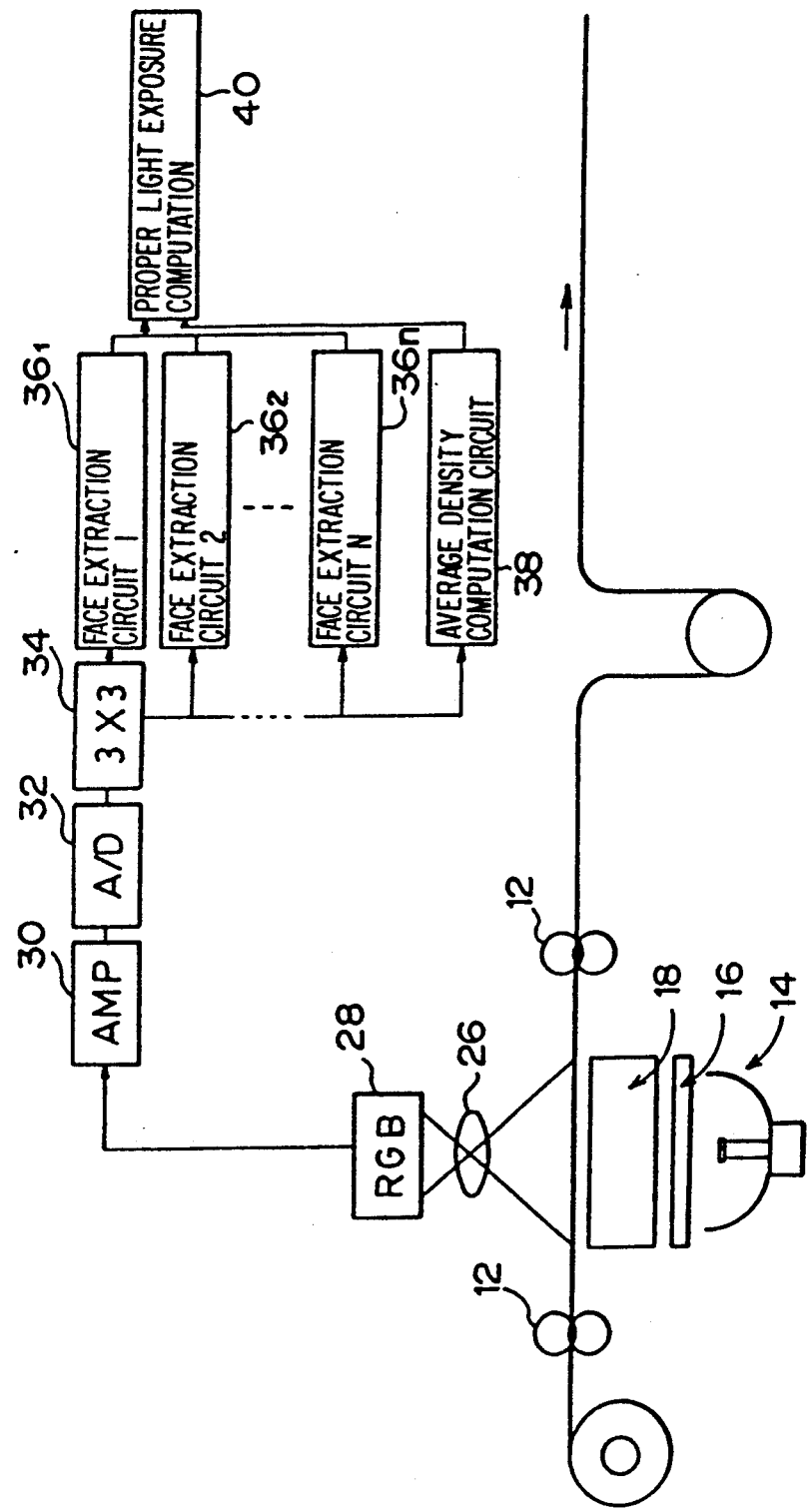
FIG. 12 is a schematic diagram of a exposure computation unit for performing parallel processing by a plurality of face extraction circuits.
Figure 13:
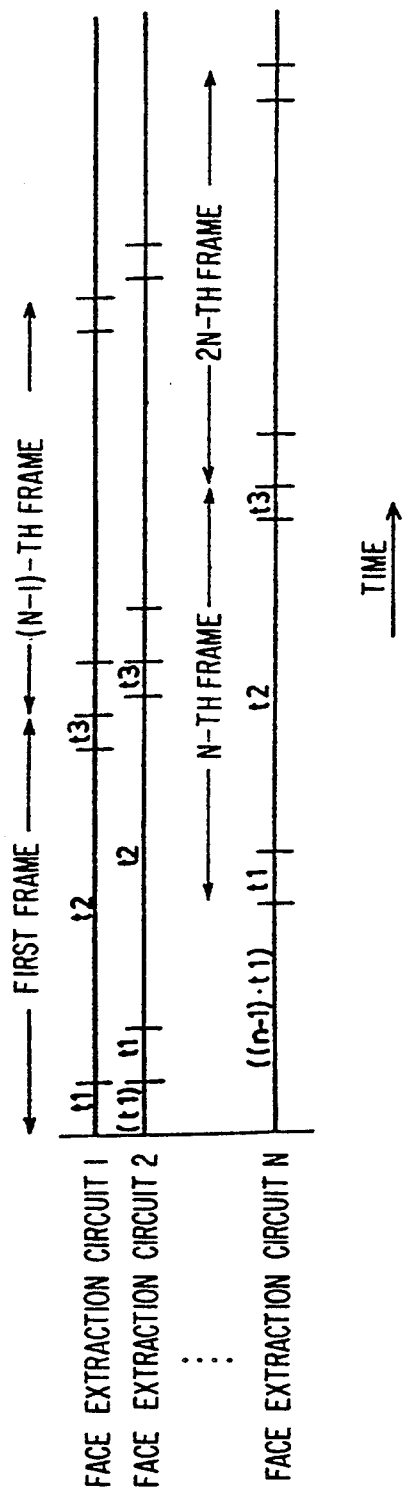
FIG. 13 is a diagram showing a time chart of parallel processing.

FIG. 12 shows that an exposure is computed through parallel processing by constituting the face extraction circuit in FIG. 11 with a plurality of face extraction circuits $36_1$, $36_2$, ..., and $36n$. The face extraction circuits $36_1$, $36_2$, ..., and $36n$ read an image in accordance with the time chart in FIG. 13, compute an exposure, and output the result. In FIG. 13, t1 is the image read time for one frame, t2 is the exposure computation time for one frame, and t3 is the exposure computation result transfer time for one frame, where t2>>t1 and t2. The face extraction circuit $36_1$ reads the image for one frame for the time of t1, computes the exposure for the time of t2, and transfers the computation result for the time of t3. As soon as one-frame image read is completed by the face extraction circuit $36_1$, the film is advanced by one frame and one-frame image read is started by the face extraction circuit $36_2$, exposure computation by the face extraction circuit $36_1$ and one-frame image read by the face extraction circuit $36_2$ are simultaneously executed, and subsequently parallel processing is continued by the face extraction circuits $36_3$, $36_4$, ..., and $36n$.

The time Tp required for parallel processing of "mxn" frames is shown as follows:

$$Tp = m(t_1 + t_2 + t_3) + (n-1)t_1$$

While, the processing time Ts without executing parallel processing is shown as follows:

$$TS = m \cdot n(t_1 + t_2 t_3)$$

Therefore, the processing speed can be increased by Ts/Tp times. In this case, Ts/Tp is shown as follows:

$$Ts/Tp = \frac{m \cdot n(t_1 + t_2 + t_3)}{m(t_1 + t_2 + t_3) + (n-1)t_1}$$

This parallel-processing system can also be applied to the printer in FIG. 1.

The present invention can also be applied not only to determination of exposure of a photo-printing equipment but to determination of exposure of a digital color printer, determination of copying conditions of a copying machine, determination of exposure of a camera, determination of display conditions of a CRT screen, and determination of exposure when a hard copy is made with magnetic image data.

What is claimed is:

1. A method of determining an exposure comprising the steps of:
   (a) dividing a color original image into many picture elements and resolving each picture element into red, green, and blue colors to photometrically measure them;
   (b) obtaining a histogram of hue values in accordance with the data obtained through photometry;
   (c) dividing the obtained histogram into a plurality of mountains;
   (d) judging which one of said plurality of mountains each picture element of the color original image belongs to, an classifying picture elements into groups based on the judging, each group corresponding to one of said plurality of mountains, thereby dividing the color original image into regional groups, the total number of regional groups being equal to the total number of mountains;
   (e) selecting at least one of the divided regional groups and extracting data for the selected group as feature image data; and
   (f) determining exposure for copying material in accordance with the extracted feature image data.

2. An exposure determination method according to claim 1, wherein a two-dimensional histogram of hue values and saturation values is obtained in accordance with the data obtained through photometry in said step (b) and the obtained two-dimensional histogram is divided into mountains in said step (c).

3. An exposure determination method according to claim 2, wherein it is judged whether a divided regional group is a person's face or not when selecting the divided region in said step (e).

4. An exposure determination method according to claim 1, wherein it is judged whether a divided regional group is a person's face or not when selecting the divided region in said step (e).

5. A method of extracting human face data comprising the steps of:
   (a) dividing a color original image into many picture elements and resolving each picture element into red, green, and blue colors to photometrically measure them;
   (b) obtaining a histogram of hue values in accordance with the data obtained through photometry;
   (c) dividing the obtained histogram into a plurality of mountains;
   (d) judging which of said plurality of mountains each picture element of the color original image belongs to, and classifying picture elements into groups based on the judging, each group corresponding to one of said plurality of mountains, thereby dividing the color original image into regional groups, the total number of regional groups being equal to the total number of mountains; and
   (e) analyzing at least one of the contours and internal structures of each divided regional group to judge whether a particular regional group depicts a human face and, based on the results of said analyzing, extracting data for the regional group judged as depicting a human face.

6. A human face data extraction method according to claim 5, wherein a two-dimensional histogram of hue values and saturation values is obtained in accordance with the data obtained through photometry in said step (b) and the obtained two-dimensional histogram is divided into mountains in said step (c).

7. A human face data extraction method according to claim 6, further comprising the step of:
   determining exposure for a copying material in accordance with the extracted human face data.

8. A human face data extraction method according to claim 5, further comprising the step of:
   determining exposure for a copying material in accordance with the extracted human face data.

9. A method of extracting human face data comprising the steps of:
   (a) dividing a color original image into many picture elements and resolving each picture element into red, green, and blue colors to photometrically measure them;
   (b) obtaining a histogram of hue values in accordance with the data obtained through photometry;
   (c) dividing the obtained histogram into a plurality of mountains;
   (d) judging which of said plurality of mountains each picture element of the color original image belongs to, and classifying picture elements into groups based on the judging, each group corresponding to one of said plurality of mountains, thereby dividing the color original image into regional groups, the total number of regional groups being equal to the total number of mountains; and
   (e) analyzing each of the divided regional groups to judge if a particular regional group depicts a human face in accordance with the shape of the regional groups around said particular regional group and, using the results of the analyzing, extracting data for the regional group judged as depicting a human face.

10. A human face data extraction method according to claim 9, wherein a two-dimensional histogram of hue values and saturation values is obtained in accordance with the data obtained through photometry in said step (b) and the obtained two-dimensional histogram is divided into mountains in said step (c).

11. A human face data extraction method according to claim 10, wherein it is judged if said particular regional group depicts a human face in accordance with the shape and color information of regional groups neighboring said particular regional group in said step (e).

12. A human face data extraction method according to claim 11, further comprising the step of:
    determining exposure for a copying material in accordance with the data for the extracted human face data.

13. A human face data extraction method according to claim 10, further comprising the step of:
    determining exposure for a copying material in accordance with the data for the extracted human face data.

14. A human face data extraction method according to claim 9, wherein it is judged if said particular regional group depicts a human face in accordance with the shape and color information of regional groups neighboring said particular regional group in said step (e).

15. A human face data extraction method according to claim 14, further comprising the step of:

determining exposure for a copying material in accordance with the data for the extracted human face data.

16. A human face data extraction method according to claim 9, further comprising the step of:
determining exposure for a copying material in accordance with the data for the extracted human face data.

* * * * *